United States Patent
Tamura et al.

(10) Patent No.: US 6,990,565 B2
(45) Date of Patent: Jan. 24, 2006

(54) ADDRESS CONVERSION APPARATUS, ADDRESS CONVERSION METHOD AND COMPUTER PROGRAM

(75) Inventors: Yoshihiro Tamura, Mukou (JP); Yutaka Tanase, Uji (JP); Kiyohide Hori, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 284 days.

(21) Appl. No.: 10/396,641

(22) Filed: Mar. 25, 2003

(65) Prior Publication Data

US 2004/0003198 A1    Jan. 1, 2004

(30) Foreign Application Priority Data

Mar. 27, 2002  (JP) .............................. 2002-089671

(51) Int. Cl.
*G06F 12/10* (2006.01)

(52) U.S. Cl. ...................... 711/202; 711/2; 711/101; 711/102; 711/104; 710/33

(58) Field of Classification Search .................... 711/2, 711/104, 170, 173, 202, 206
See application file for complete search history.

(56) References Cited

U.S. PATENT DOCUMENTS

| | | | |
|---|---|---|---|
| 5,329,631 A | | 7/1994 | Ishibashi et al. |
| 6,378,058 B1 | * | 4/2002 | Furuhashi ................... 711/203 |
| 6,425,047 B1 | * | 7/2002 | Ozaki .......................... 711/101 |
| 6,728,860 B2 | * | 4/2004 | Lloyd-Jones ................ 711/206 |
| 2003/0126349 A1 | * | 7/2003 | Nalawadi et al. .............. 711/2 |
| 2004/0078513 A1 | * | 4/2004 | Yamazaki ................... 711/104 |

* cited by examiner

*Primary Examiner*—Jasmine Song

(57) ABSTRACT

An address output apparatus capable of retaining a pre-extension upper compatibility of software post memory extension and of accessing separated RAM areas by consecutive addresses, without needing to alter CPU architecture. The address output apparatus includes an address conversion circuit 20 that allots to a RAM 30 a basic RAM area and a first area, being one of two area obtained by dividing an extension RAM area, allots to a RAM 50 a second area, being an area other than the first area of the extension RAM area, and converts logical address signals designated by a CPU 10 to physical address signals based on a state of the allotting.

9 Claims, 7 Drawing Sheets

FIG.3

| LOGICAL ADDRESS SPACE | LOGICAL ADDRESS | PHYSICAL ADDRESS | MEMORY DEVICE |
|---|---|---|---|
| BASIC RAM SPACE | X'00000' ~ X'00FFF' | X'00000' ~ X'00FFF' | RAM30 |
| ROM SPACE | X'01000' ~ X'0FFFF' | X'01000' ~ X'0FFFF' | ROM40 |
| FIRST SPACE | X'10000' ~ X'10FFF' | X'00000' ~ X'00FFF' | RAM30 |
| SECOND SPACE | X'11000' ~ X'11FFF' | X'11000' ~ X'11FFF' | RAM50 |

FIG.6

| PRE-CONVERSION ADDRESS | CPU OUTPUT SIGNAL | | ACCESS CONTROL CIRCUIT OUTPUT SIGNAL | | ACCESS RAM |
|---|---|---|---|---|---|
| | 90a | 90b | 110a | 110b | |
| X'00000'~X'00FFF' | X'00' | X'000'~X'FFF' | 1 | 0 | RAM30 |
| X'10000'~X'10FFF' | X'10' | X'000'~X'FFF' | 1 | 0 | RAM30 |
| X'11000'~X'11FFF' | X'11' | X'000'~X'FFF' | 0 | 1 | RAM50 |

ADDRESS CONVERSION APPARATUS, ADDRESS CONVERSION METHOD AND COMPUTER PROGRAM

This application is based on application no.2002-089671 filed in Japan, the content of which is hereby incorporated by reference.

BACKGROUND OF THE INVENTION

1. Field of the Invention

The present invention relates to technology for accessing memory space in a microprocessor.

2. Description of the Related Art

Conventionally, one way of placing a RAM area and a ROM area in a memory address space provided in a microprocessor seeks to shorten instruction codes and instruction execution cycles. This placement method involves placing the RAM area at a head of the memory address space; that is, in a memory address space having a relatively low value. This allows for the utilization of so-called short addressing access, in which the CPU, when accessing the RAM area, designates and accesses only the low order bits of memory addresses, the high order bits having being omitted. Using this access method, it is possible to shorten instruction operands for designating memory addresses, and as a result instruction codes and instruction execution cycles can be shortened.

More specifically, the RAM area is placed, for example, to include memory addresses x'00000' to x'000FF' (x' ' showing that the numerical values within the ' ' form a hexadecimal memory address) within memory space expressed by 20-bit memory addresses. To access x'00000' to x'000FF' in the RAM area, it thus becomes possible for the CPU to designate and access only the low order 8 bits, and the high order 12 bits are omitted. Here, the ROM area is placed after the RAM area; that is, in memory address locations having higher values than the memory addresses in which the RAM area is placed.

Consideration will now be given to placing memory areas in the memory address space of the above microprocessor, when another RAM is newly added and the RAM area is extended. So as to be also able to employ short addressing access after extending, placement of the existing RAM area (referred to as "basic RAM") must still be at the head of the memory address space after extending. As such, the placement method for the various areas is, in the order from an address head: basic RAM area, ROM area, newly added RAM area (referred to as "extension RAM"), or: basic RAM area, extension RAM area, ROM area.

When the placement method is in the order, basic RAM area, ROM area, extension RAM area, there is no need to change the pre-extension placement of the basic RAM area and ROM area. Software created for the microprocessor prior to the extension can also be used post-extension, and software compatibility can thus be preserved after extending.

However with this placement method, memory addresses of the basic RAM area and the extension RAM area are separated by the ROM area and are thus discontinuous. This becomes a problem when memory addresses are accessed sequentially in ascending order in transferring large amounts of data.

On the other hand, when the placement method is in the order, basic RAM area, extension RAM area, ROM area, consecutive memory addresses can be allotted to the basic RAM area and the extension RAM area. Since the above problem does not arise, this placement method is suitable when large amounts of data are accessed in the memory address order.

However with this placement method, because the extension RAM area is placed after the basic RAM area, the ROM area has to be shifted back from its pre-extension placement. Since the memory addresses allotted to the ROM area change from pre- to post-extension of the RAM area, the problem arises of not being able to employ pre-extension software created for the microprocessor after extending.

SUMMARY OF THE INVENTION

In view of the above issues, an object of the present invention is to provide an address output apparatus that retains, in a microprocessor, the pre-extension compatibility of software after extending a RAM area, and that allows access designating consecutive memory addresses, with respect to a basic RAM area and an extension RAM area.

An address output apparatus of the present invention provided to solve the above problems is an address conversion apparatus that outputs address signals for accessing readable/writable first and second memories, and includes: an acquisition unit operable to acquire a logical address value; and an output unit operable to output an address signal for accessing the first memory when the acquired logical address value is included in a first range, to output an address signal for accessing the first memory when the logical address value is included in a third range, which is a section within a second range, the second range being separated from the first range by an interval, and to output an address signal for accessing the second memory when the logical address value is included within the second range and not in the third range.

According to this structure, if the first memory is basic RAM and the second memory is extension RAM, logical address values designated by pre-extension software involve, the same as pre-extension, accessing the first memory, and the compatibility of software is thus secured. Moreover, by dividing the second range into a third range and a range other than the third range, and allotting these ranges to the first and second memories, it is possible access the first and second memories as contiguous address spaces.

Here, a head address value of the second range may be greater than an end address value of the first range.

Here, the output unit may include a select signal output subunit operable to specify which range the acquired logical address value is included in, by whether high order bits of the logical address value match high order bits common between the head and end addresses of each range, and to output to the first and second memories a select signal showing which of the first and second memories to access in accordance with a specification result, and an address conversion subunit operable to output to the first and second memories as an address signal, low order bits that exclude the high order bits from the logical address value.

According to these structures, the address conversion apparatus is able to generate select signals from high order bits of logical address values using a simple circuit structure, and to specify access locations by low order bits of logical address values, as a result of the memories being selected by these select signals.

The address conversion apparatus may further include a control unit operable to control a validity and invalidity of operations of the output unit depending on whether the second memory is used.

According to this structure, power consumption is reduced as a result of the address conversion apparatus invalidating operations of the output unit when RAM is not extended.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 3 shows a table of the correspondence between physical addresses and logical addresses;

FIG. 6 shows a relationship between address signals sent by a CPU 10, signals of the various signal lines, and accessed RAM.

DETAILED DESCRIPTION OF THE PREFERRED EMBODIMENTS

The embodiments of the present invention will be described below in detail with reference to the drawings.

Embodiment 1

Figure 1:
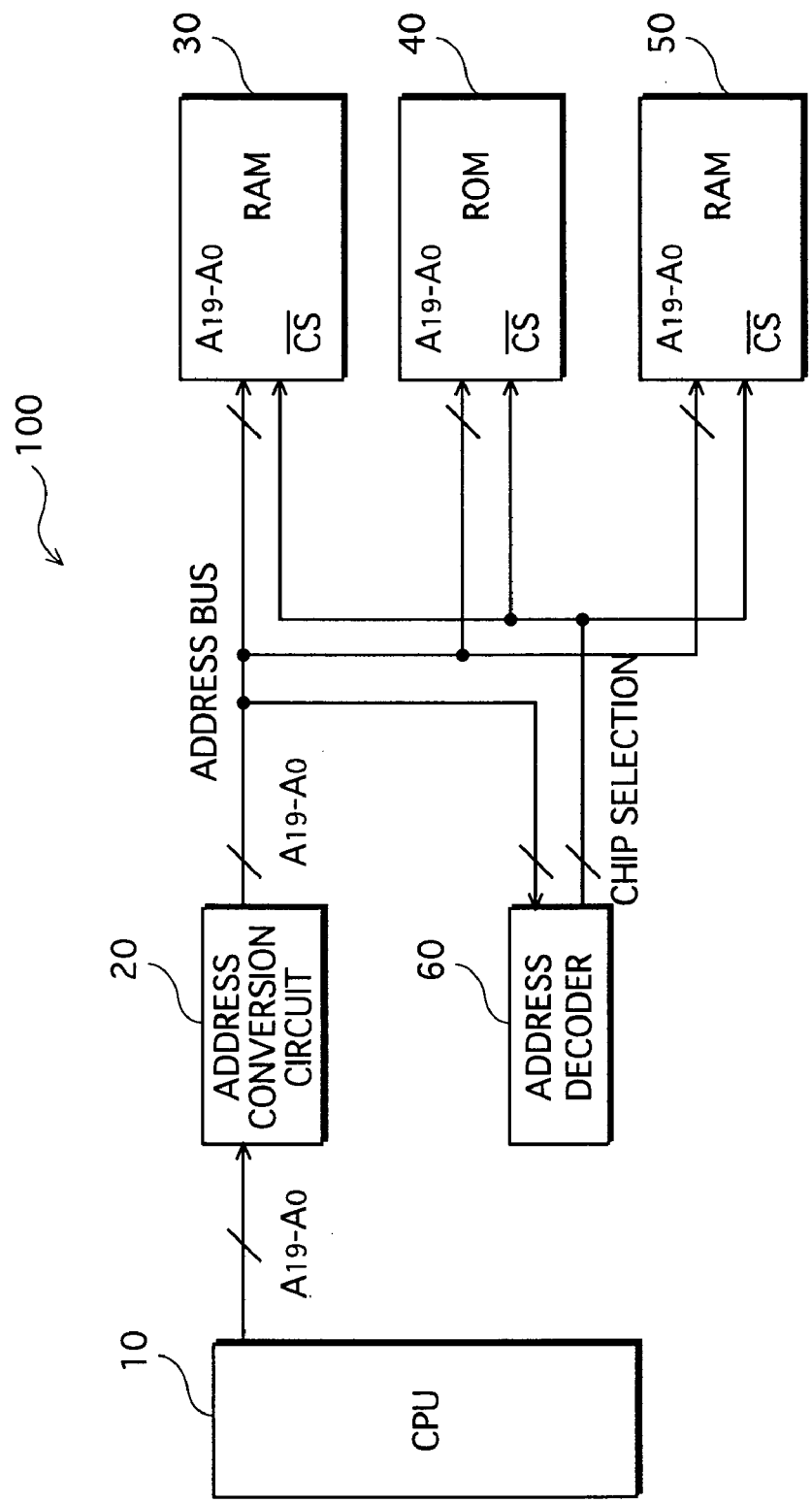
FIG. 1 shows a structure of a characteristic section of a microprocessor of an embodiment 1.

FIG. 1 shows a structure of a characteristic section of a microprocessor of the present embodiment.

A microprocessor 100 in FIG. 1 includes a CPU 10 that conducts calculations and controls, an address conversion circuit 20 that converts logical address signals outputted by CPU 10 into physical address signals, a RAM 30 and a RAM 50 which are writable memories, a ROM 40 which is read-only memory that stores computer programs and the like, and an address decoder 60 that sends select signals to access-targeted memory devices based on physical address signals.

Omitting RAM 50 and address conversion circuit 20 from this structure result in a structure similar to a basic structure of a conventional microprocessor prior to RAM area being extended. In the present embodiment, RAM 50 is added to this basic structure in order to extend the RAM area, and address conversion circuit 20 is further added in order to resolve problems in the prior art. These prior art problems are, as mentioned above, the compatibility of software before and after extension, and the discontinuity of memory addresses between RAM areas. The correspondence between logical addresses and physical addresses converted by the address conversion circuit is focused on in order to resolve these problems. Here, a physical address is an address actually allotted to a memory device, and a logical address is an address used when CPU 10 designates and accesses a memory address.

Figure 2:
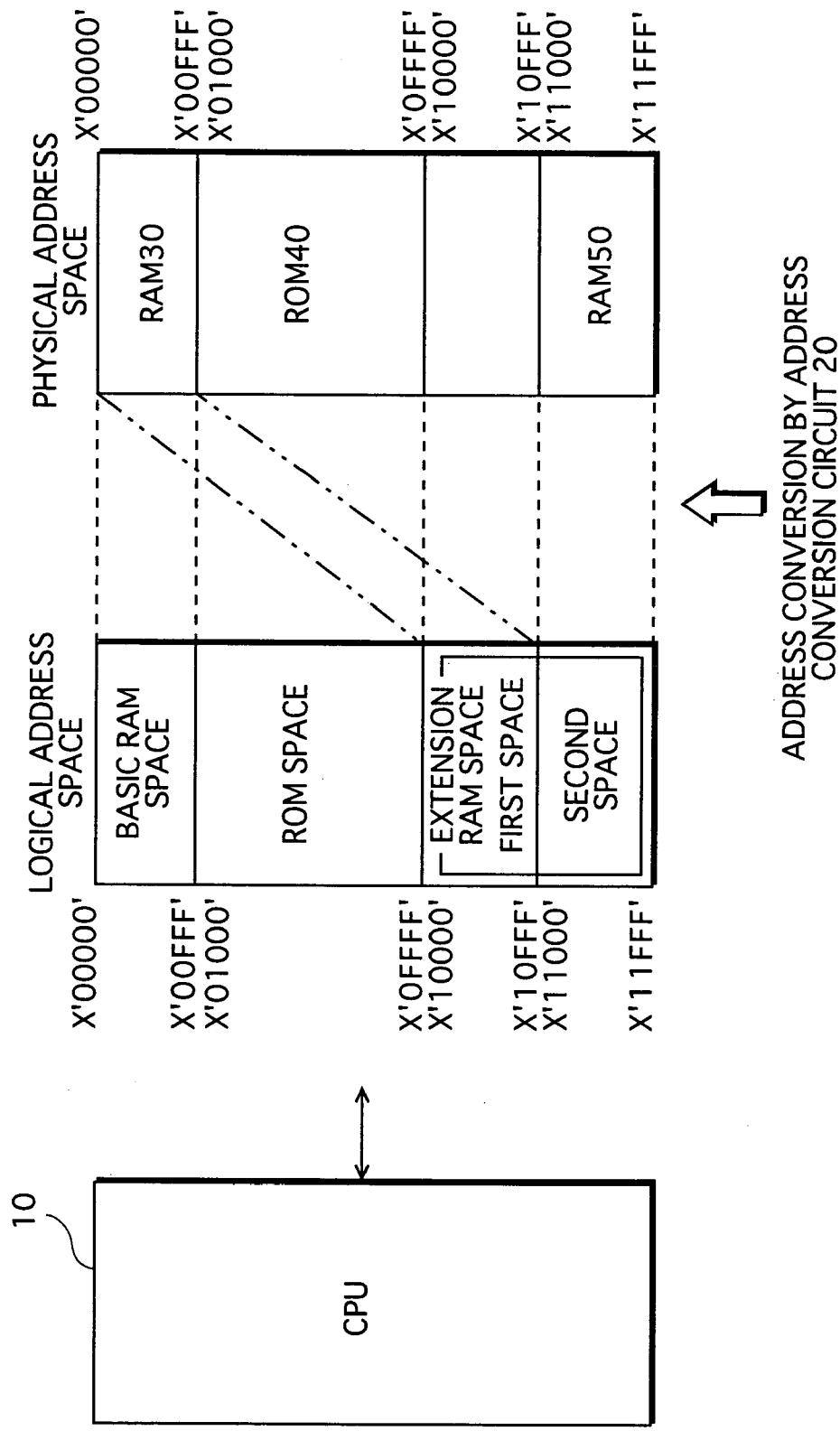
FIG. 2 shows a correspondence relationship between a physical address space and a logical address space.

FIG. 2 shows the correspondence relationship between a physical address space and a logical address space.

As shown in FIG. 2, in the physical address space is placed a 4-kilobyte RAM 30 in a head section x'00000' to x'00FFF'. The reason for placing RAM 30 at the head like this is, as described in the Related Art, to allow usage of short addressing access.

Following RAM 30 is placed a 60-kilobyte ROM 40 from x'01000' to x'0FFFF'.

The placement of RAM 30 and ROM 40 is the same after extending with RAM 50, and does not need to be changed. Software compatibility is maintained as a result of the placement being the same.

A 4-kilobyte RAM 50 is placed from x'11000' to x'11FFF', so as not to interfere with the placement of RAM 30 and ROM 40 in the physical address space. Between ROM 40 and RAM 50 is an address interval equivalent to at least the area of RAM 30, and nothing is placed in this interval.

On the other hand, in the logical address space is placed a 4-kilobyte basic RAM area from x'00000' to x'00FFF', following the basic RAM area is placed a 60-kilobyte ROM area from x'01000' to x'0FFFF', and following the ROM area is placed a 8-kilobyte extension RAM area from x'10000' to x'11FFF'. This extension RAM area is divided into a first area from x'10000' to x'10FFF' and a second area from x'11000' to x'11FFF'.

The correspondence relationship between the logical address space and the physical address space is such that the basic RAM area corresponds to the area of RAM 30, the ROM area corresponds to the area of ROM 40, the first area corresponds to the area of RAM 30, and the second area corresponds to the area of RAM 50, logical addresses and physical addresses in corresponding areas being in one-to-one correspondence in the arrangement order of the addresses.

Here, the first area is referred to as a mirror area of the basic RAM area, since the first area and the basic RAM area are both mapped to the area of RAM 30.

FIG. 3 shows a table of the correspondence between physical addresses and logical addresses.

Address conversion circuit 20, when logical addresses of the basic RAM area, the ROM area and the second area are inputted by CPU 10, outputs, as physical addresses, the same values as the inputted logical addresses.

On the other hand, address conversion circuit 20, when logical addresses x'10000' to x'10FFF' are inputted by CPU 10, converts the inputted to addresses to physical addresses x'00000' to x'00FFF' and outputs the converted addresses. To give an example, address conversion circuit 20 converts logical address x'10000' to physical address x'00000', converts logical address x'10001' to physical address x'00001', converts logical address x'10002' to physical address x'00002', and converts logical address x'10FFF' to physical address x'00FFF'.

As a result of these conversions, the specifying of logical addresses and accessing of the basic RAM area and ROM area by CPU 10 equates to the specifying of logical addresses and accessing of the area of RAM 30 and the area of ROM 40 by CPU 10 in a pre-extension microprocessor. As such, it is possible to also employ, in post-extension microprocessor 100, software for use in a pre-extension microprocessor, and software compatibility is thus preserved.

Furthermore, consecutive logical addresses are allotted, with the first area corresponding to RAM 30 and the second area corresponding to RAM 50 following one after the other. Since it is possible, as a result, to access an extension RAM area formed from consecutive logical addresses, mass data such as music data and the like can be recorded to extend from the area of RAM 30 to the area of RAM 50, this structure being suitable, for instance, when specifying and accessing sequential addresses.

Figure 4:
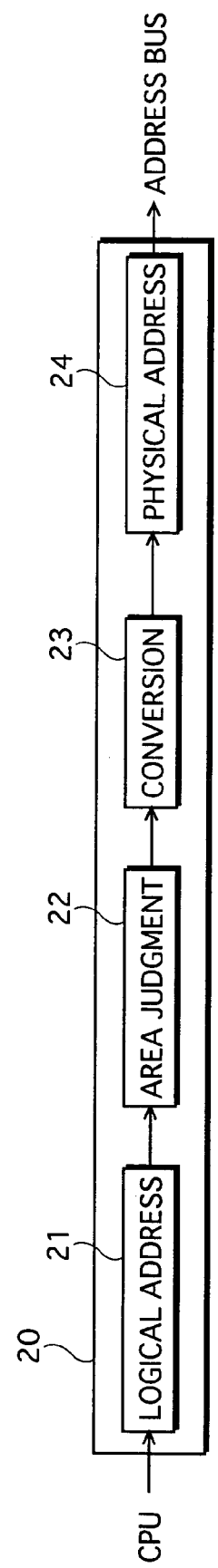
FIG. 4 shows a detailed structure of an address conversion circuit 20.

FIG. 4 shows a detailed structure of address conversion circuit 20.

Address conversion circuit 20 in FIG. 4 is structured from a logical address holding unit 21, an area judgment unit 22, a conversion unit 23 and a physical address holding unit 24.

Logical address holding unit 21 is a buffer that holds logical addresses sent from CPU 10.

Area judgment unit 22 judges which area of the physical address space shown in FIG. 2 a logical address held by logical address holding unit 21 belongs to. This judgment is conducted by a logical circuit that compares the size of logical addresses x'00000', x'01000', x'10000', and x'11000' at the head of each of the areas in the logical address space with the logical address held by logical address holding unit 21.

Conversion unit 23, when judged as a result of the judgment by area judgment unit 22 that the logical address belongs to one of the basic RAM area, the ROM area, and the second area, outputs, as a physical address, the same value as the logical address, and when judged that the logical address belongs to the first area, converts the logical address to a physical address corresponding to the area of RAM 30 and outputs the converted address. This conversion involves converting a value of the $4^{th}$ bit from a most significant bit in the logical address from 1 to 0.

Physical address holding unit 24 is a buffer that holds physical addresses outputted from conversion unit 23, and outputs the held physical addresses to an address bus 70.

The physical addresses outputted from physical address holding unit 24 are inputted into each of RAM 30, ROM 40 and RAM 50, and the high order 8 bits are inputted into address decoder 60. Address decoder 60 selects which memory device to access out of RAM 30, ROM 40 and RAM 50, from a comparison of a value of the inputted high order 8 bits of the physical address with a range of the physical addresses of each area in the physical address space, and outputs a select signal to the selected memory device. The memory device that receives this select signal recognizes the inputted physical address as an address for itself, and accesses that memory address.

As a result of the above structure, the placement of pre-expansion address spaces is not changed, and thus in addition to being able to employ, in post-extension microprocessor 100, software for use in a pre-extension microprocessor, microprocessor 100 is able to access RAM 30 and RAM 50 placed separately in the physical address space using consecutive physical addresses.

Embodiment 2

Figure 5:
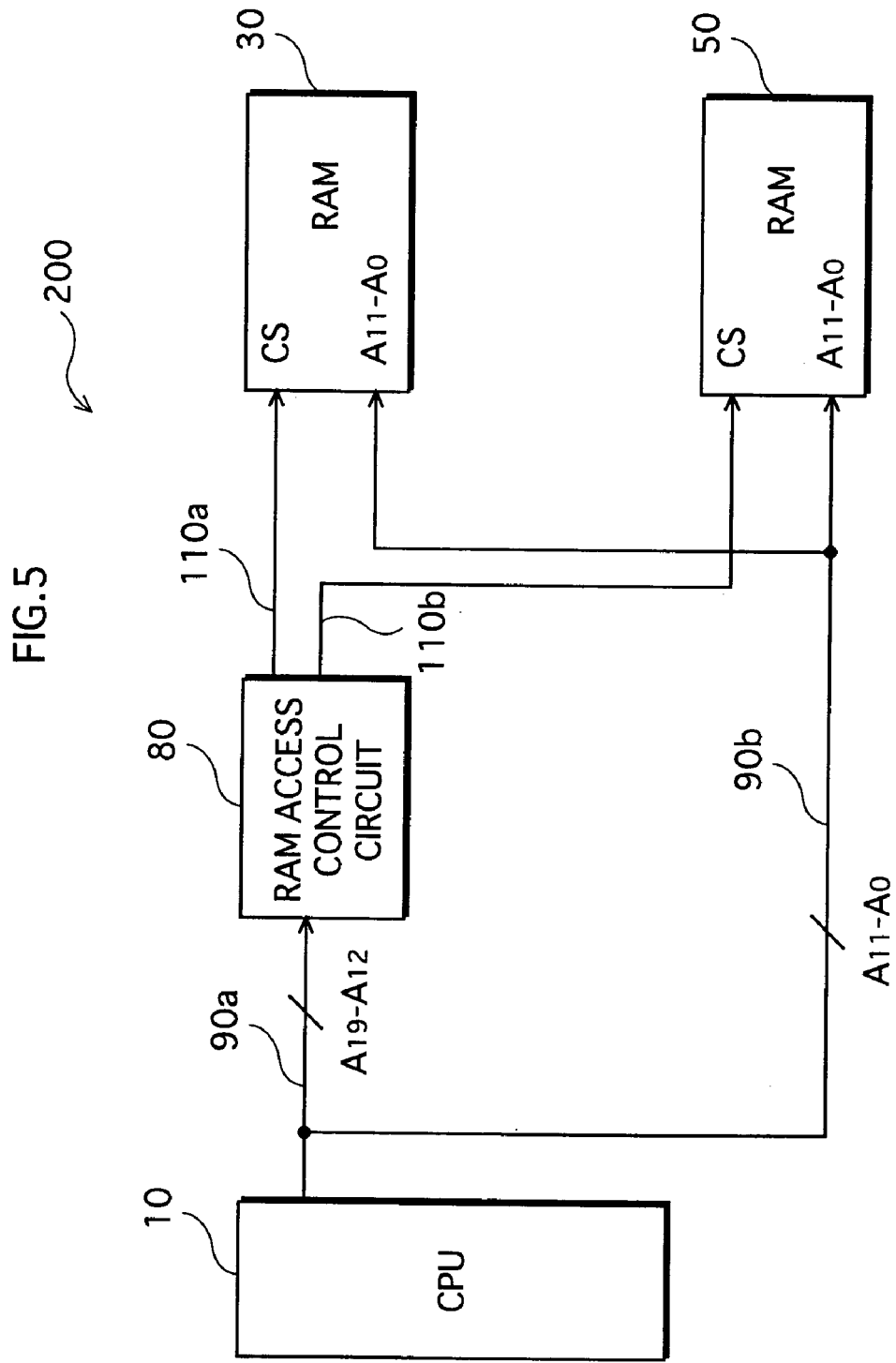
FIG. 5 shows a structure of a characteristic section of a microprocessor of an embodiment 2.

FIG. 5 shows a structure of a characteristic section of a microprocessor of an embodiment 2.

In a microprocessor 200 in FIG. 5, structural elements having the same numbering as microprocessor 100 in FIG. 1 are the same. Although in FIG. 5 depiction of ROM 40 is omitted, logical addresses outputted by the CPU are accessed as physical addresses in ROM 40 in an unaltered state. The following description centers on the differences with embodiment 1. Here, the memory mapping in the present embodiment is the same as FIGS. 2 and 3 of embodiment 1.

The high order 8 bits of address signals sent from CPU 10 are transferred to a RAM access control circuit 80 by a signal line 90a of the address bus, and the low order 12 bits are transferred to RAM 30 and RAM 50 by a signal line 90b of the address bus.

RAM access control circuit 80 is a structural element that replaces address conversion circuit 20 and address decoder 60, and sends, on a signal line 110a and a signal line 110b, a select signal showing which of RAM 30 and RAM 50 is selected based on the high order 8 bits of an address signal. When RAM 30 is selected, the signal on signal line 110a is "1" and the signal on signal line 110b is "0", and vice versa when RAM 50 is selected.

RAM 30 accesses an address shown by the low order 12 bits of an address signal of signal line 90b when the select signal of signal line 110a is "1".

RAM 50 accesses an address shown by the low order 12 bits of an address signal of signal line 90b when the select signal of signal line 110b is "1".

FIG. 6 shows a relationship between address signals sent by CPU 10, the signals of the signal lines, and the accessed RAM.

As shown in FIG. 6, when the value of signal line 90a is x'00' and x'10', the signals of signal lines 110a and 110b are respectively "1" and "0", resulting in RAM 30 being accessed, and when the value of signal line 90a is x'11', the signals of signal lines 110a and 110b are respectively "0" and "1", resulting in RAM 50 being accessed.

In other words, RAM access control circuit 80 specifies which range an address signal belongs to, by whether the high order 8 bits common between the head address and end address of the pre-conversion addresses in each range in FIG. 6, are the same value as the high order 8 bits of an address signal output by CPU 10, and outputs to RAM 30 and RAM 50 a select signal showing which of RAM 30 and RAM 50 to access in accordance with the specification result. RAM 30 or RAM 50 selected by the select signal then specifies a location to be accessed from the low order 12 bits of the address signal.

As a result of the above structure, microprocessor 200 is able to exhibit the same effects as microprocessor 100 using smaller scale circuitry than microprocessor 100.

Embodiment 3

Figure 7:
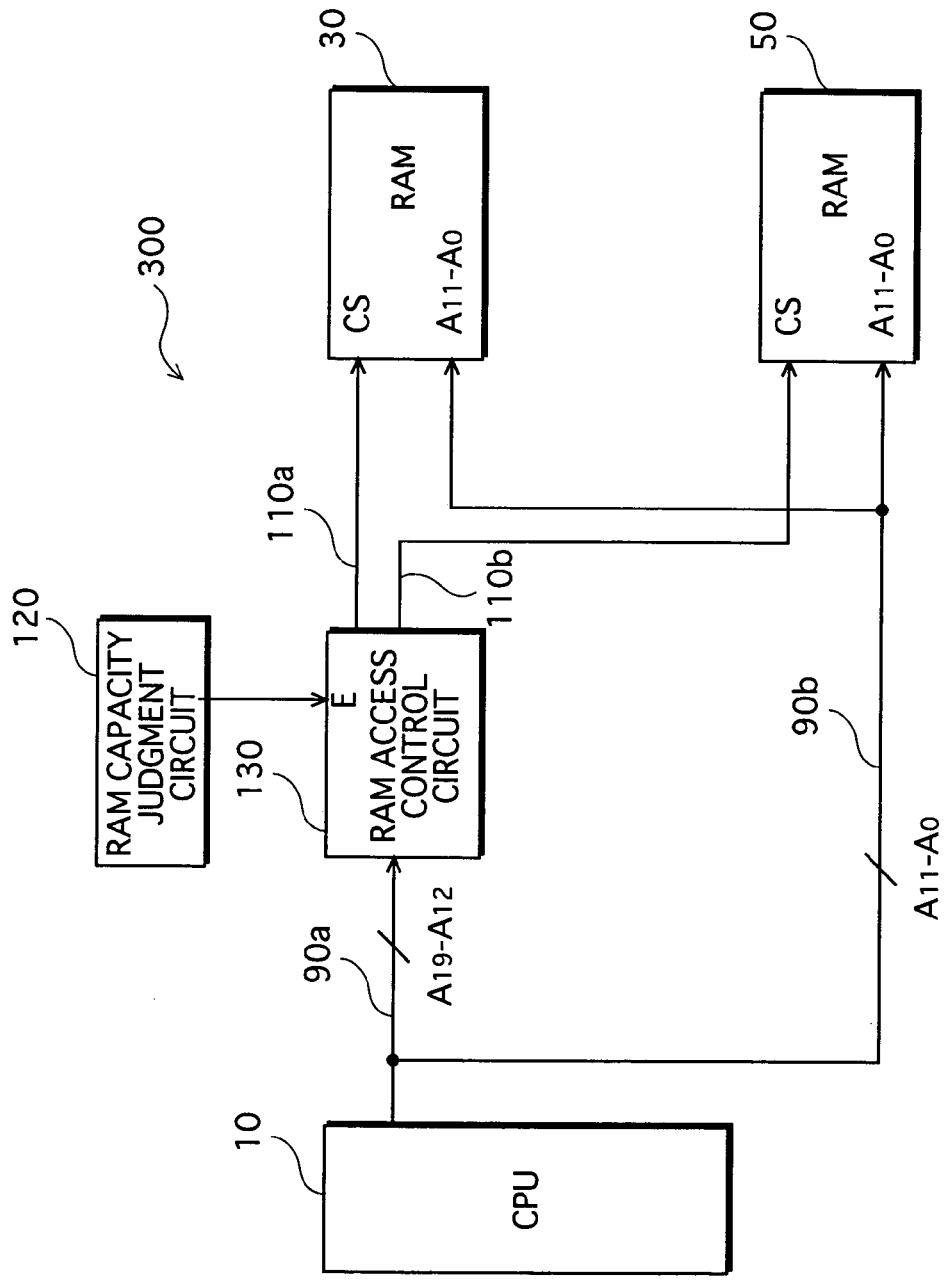
FIG. 7 shows a structure of a characteristic section of a microprocessor of an embodiment 3.

FIG. 7 shows a structure of a characteristic section of a microprocessor of embodiment 3.

A microprocessor 300 in FIG. 7 is different from microprocessor 200 in FIG. 2 in that it includes, instead of RAM access control circuit 80, a RAM access control circuit 130 having an enable signal input terminal, and has added thereto a RAM capacity judgment circuit 120 that outputs an enable signal.

RAM capacity judgment circuit 120 judges whether the RAM capacity has been extended, sends an enable signal of "1" or "0" in accordance with the judgment, and thus controls the operation or suspension of the RAM access control circuit. The judgment as to whether the RAM capacity has been extended is conducted, for instance, by judging whether operator guidance by a user, a computer program or the like has been received, or whether RAM 50 is connected to microprocessor 300. As a result of this enable signal, microprocessor 300 is able to switch between a mode that uses both the basic RAM area and the extension RAM area, and a mode that uses only the basic RAM area.

When the enable signal is "1", RAM access control circuit 130 operates in the same manner as RAM access control circuit 80 of embodiment 2.

When the enable signal is "0", RAM access control circuit 130 outputs a select signal of "1" on signal line 110a and a select signal of "0" on signal line 110b, and the operation of RAM access control circuit 130 is suspended. Due to this suspension, when the low order 12 bits of an address signal outputted by CPU 10 appears on the address bus, it is possible to access RAM 30 using this low order 12 bit signal.

As a result of this structure it is possible to reduce power consumption, since the operation of RAM access control circuit 130 is suspended and the high order 8 bits on the address bus are no longer used when RAM extension is not conducted with respect to microprocessor 300.

Although embodiments of the present invention have been described above, the present invention is not limited to these embodiments. The present invention may, for example, be structured as follows.

Although address conversion circuit 20 is structured so as to judge which area of the logical address space an inputted logical address belongs to and to conduct address conversion in accordance with the judged area, address conversion circuit 20 may have a very simple circuit structure that judges whether an inputted logical circuit belongs to the first area, conducts address conversion if it does, and outputs the logical address in an unaltered state without conducted address conversion if it does not.

Although in FIG. 3 the value of logical addresses in the basic RAM area, the ROM area and the second area are the same as corresponding physical addresses, they need not be the same. In sum, it is sufficient that the basic RAM area and the first area correspond to RAM 30, that the basic RAM area and the first area are separated with an interval opened up therebetween, and that the second area is mapped to correspond to RAM 50.

In FIG. 3, the second area may be mapped to correspond to RAM 30 and the first area may be mapped to correspond to RAM 50.

Furthermore, although in FIG. 3 a structure of the extension RAM area is divided into a first area and a second area, it is not limited to this structure, and may be structured such that a section of the extension RAM area is determined as a first area, and a remaining section of the extension RAM area that is not part of the first area is determined as a second area. That is, the second area may be divided in two and sandwich the first area top and bottom, or conversely, the first area may be divided in two and sandwich the second area top and bottom.

Although in the embodiments, values are allotted so that the head address in the extension RAM area has a larger value than then the end address in the basic RAM area, values may be allotted such that the head address in the basic RAM area has a larger value than then the end address in the extension RAM area.

Although in the embodiments address conversion circuit 20, address decoder 60, RAM access control circuit 80, RAM capacity judgment circuit 120 and RAM access control circuit 130 are constituted by hardware, they may be structured by software that realizes the same functions using a computer program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An address conversion apparatus that outputs address signals for accessing readable/writable first and second memories, comprising:
    an acquisition unit operable to acquire a logical address value; and
    an output unit operable to output an address signal for accessing the first memory when the acquired logical address value is included in a first range, to output an address signal for accessing the first memory when the logical address value is included in a second range separated from the first range by an interval, and to output an address signal for accessing the second memory when the logical address value is included within a third range successive to the second range.

2. The address conversion apparatus of claim 1, wherein a head address value of the second range is greater than an end address value of the first range.

3. The address conversion apparatus of claim 1, wherein the output unit includes a select signal output subunit operable to specify which range the acquired logical address value is included in, by whether high order bits of the logical address value match high order bits common between the head and end addresses of each range, and to output to the first and second memories a select signal showing which of the first and second memories to access in accordance with a specification result; and
    an address conversion subunit operable to output to the first and second memories as an address signal, low order bits that exclude the high order bits from the logical address value.

4. The address conversion apparatus of claim 2, wherein the output unit includes a select signal output subunit operable to specify which range the acquired logical address value is included in, by whether high order bits of the logical address value match high order bits common between the head and end addresses of each range, and to output to the first and second memories a select signal showing which of the first and second memories to access in accordance with a specification result; and
    an address conversion subunit operable to output to the first and second memories as an address signal, low order bits that exclude the high order bits from the logical address value.

5. The address conversion apparatus of claim 1, further comprising:
    a control unit operable to control a validity and invalidity of operations of the output unit depending on whether the second memory is used.

6. The address conversion apparatus of claim 2, further comprising:
    a control unit operable to control a validity and invalidity of operations of the output unit depending on whether the second memory is used.

7. The address conversion apparatus of claim 3, further comprising:
    a control unit operable to control a validity and invalidity of operations of the output unit depending on whether the second memory is used.

8. An address conversion method that outputs address signals for accessing readable/writable first and second memories, comprising:
    an acquisition step of acquiring a logical address value; and
    an output step of outputting an address signal for accessing the first memory when the acquired logical address value is included in a first range, outputting an address signal for accessing the first memory when the logical address value is included in a second range separated from the first range by an interval, and outputting an address signal for accessing the second memory when the logical address value is included within a third range successive to the second range.

9. A computer program executed by an address conversion apparatus that outputs address signals for accessing readable/writable first and second memories, comprising:
an acquisition step of acquiring a logical address value; and
an output step of outputting an address signal for accessing the first memory when the acquired logical address value is included in a first range, outputting an address signal for accessing the first memory when the logical address value is included in a second range separated from the first range by an interval, and outputting an address signal for accessing the second memory when the logical address value is included within a third range successive to the second range.

* * * * *